United States Patent Office 3,233,676
Patented Feb. 8, 1966

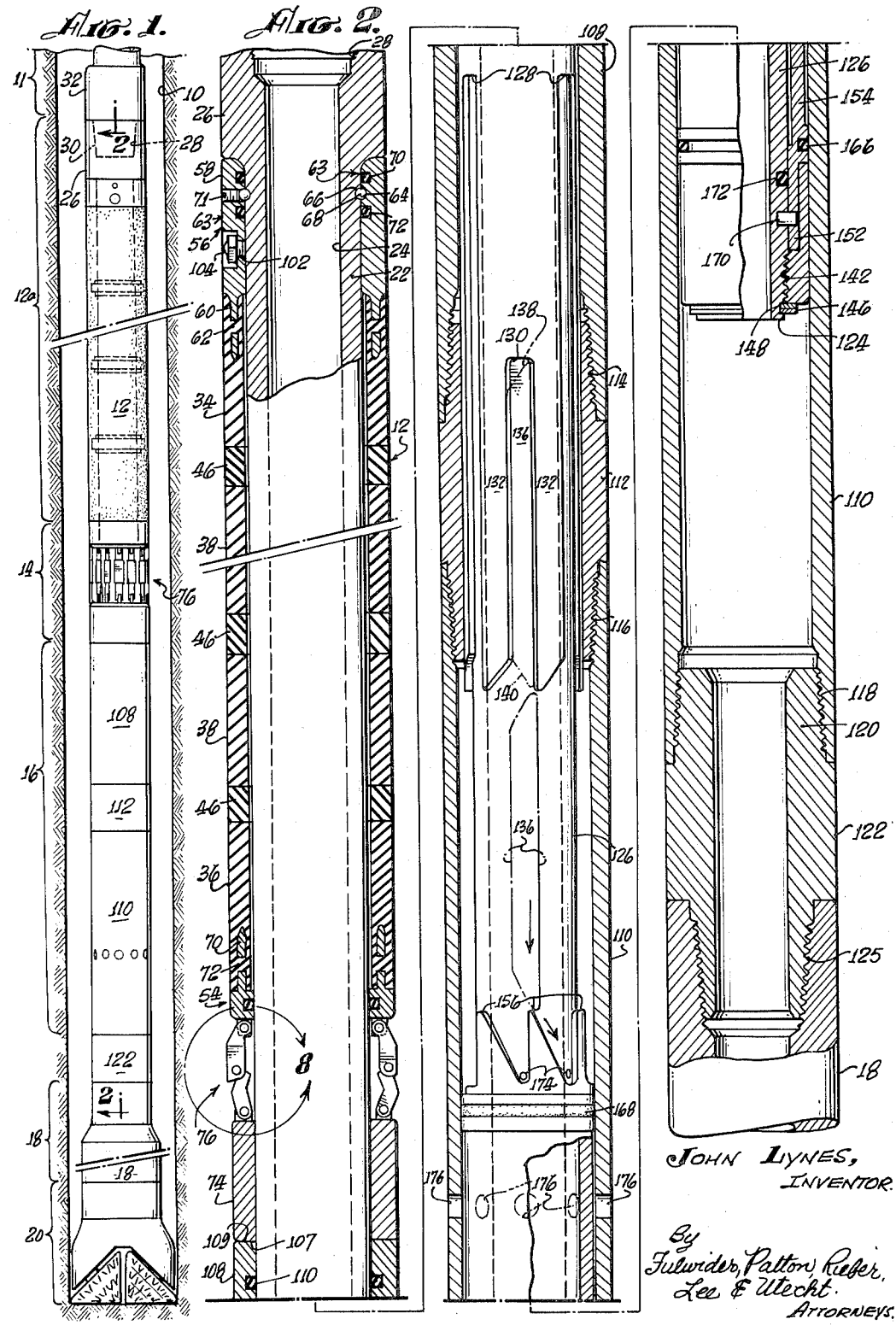

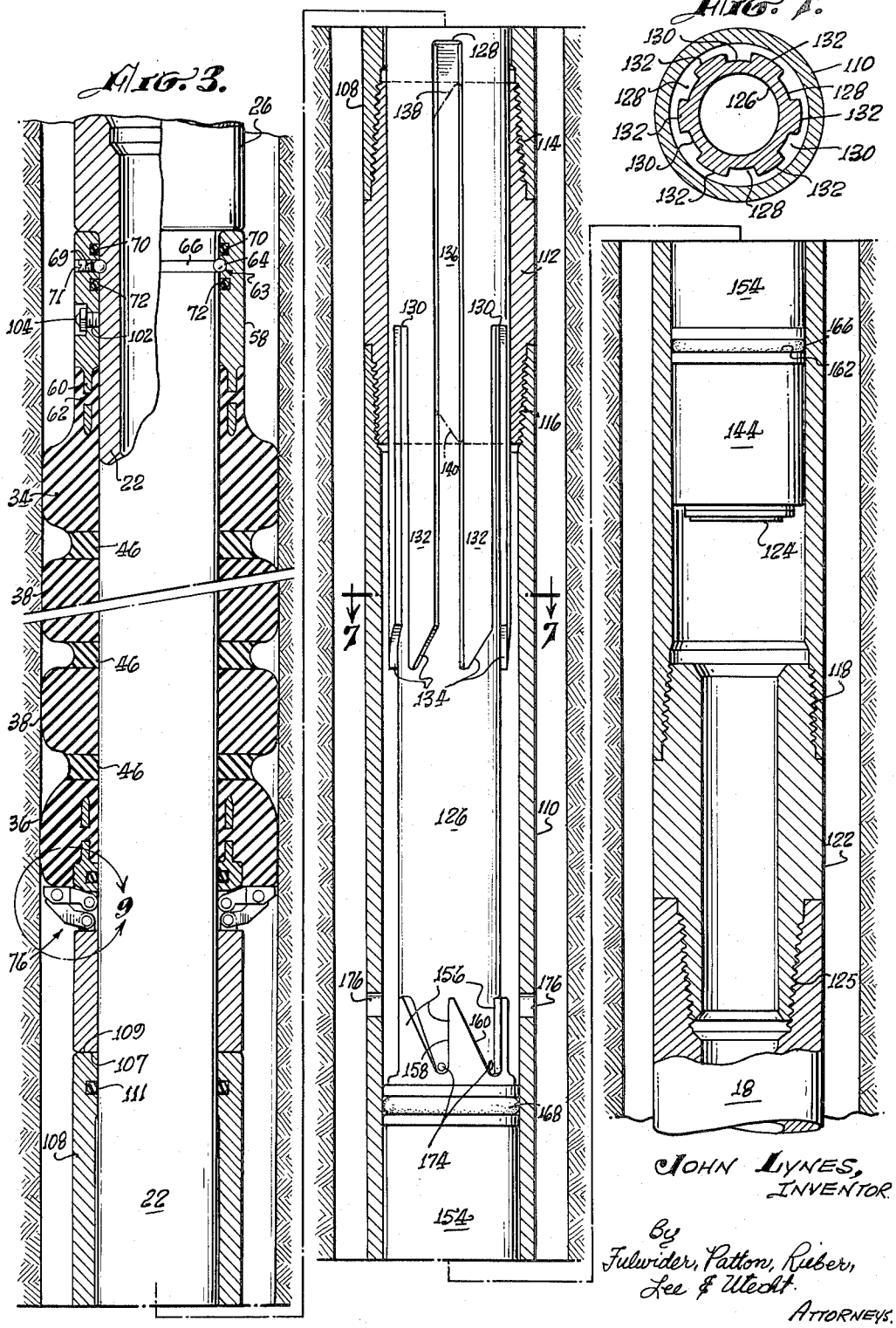

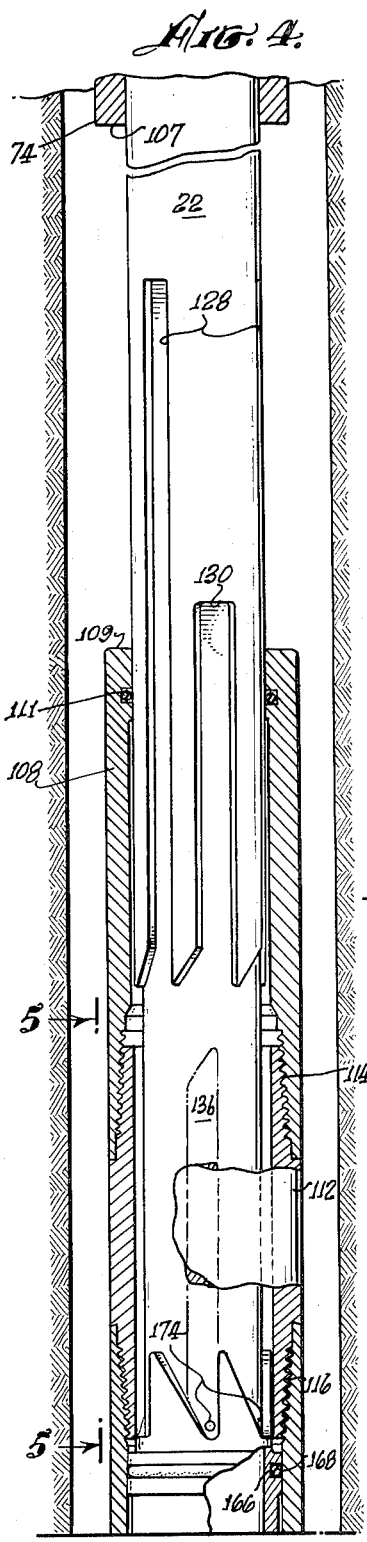
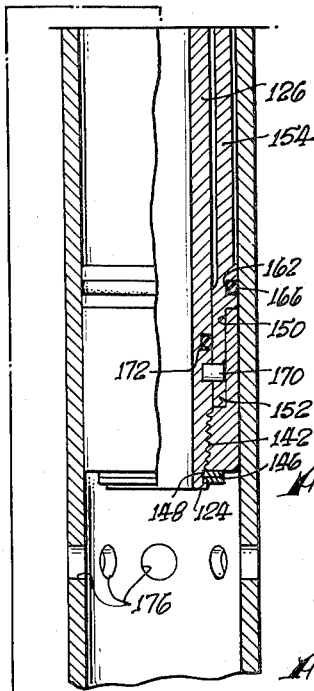
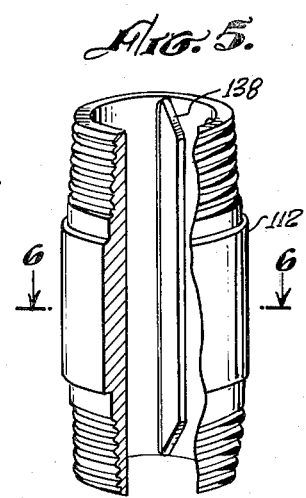
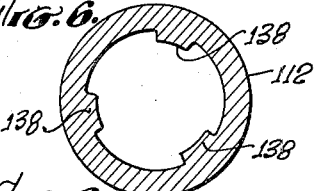
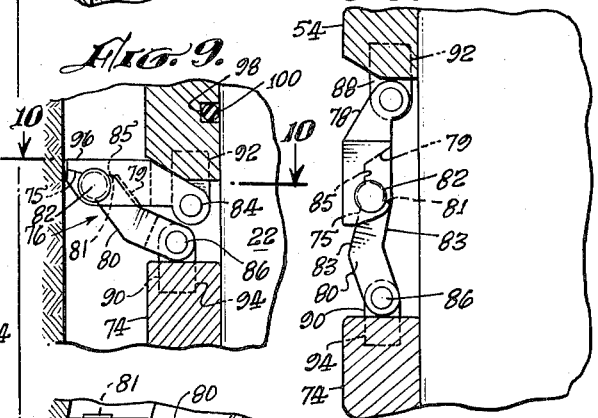
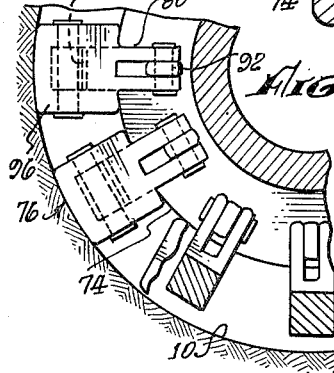
INVENTOR.
JOHN LYNES,
By Fulwider, Patton,
Rieber, Lee & Utecht.
ATTORNEYS.

3,233,676
EARTH BOREHOLE DRILLING AND TESTING TOOL
John Lynes, Midland, Tex., assignor to General Oil Tools, Inc., Phoenix, Ariz., a corporation of Arizona
Filed Oct. 8, 1964, Ser. No. 402,649
20 Claims. (Cl. 166—152)

This invention relates generally to earth borehole drilling apparatus, and more particularly to apparatus by means of which the fluid contents of earth formations being penetrated by the drill bit can be tested frequently and at any time during drilling operations, without withdrawal of the drill stem from the borehole.

This application relates in some respects to improvements in the apparatus of copending application, Serial No. 206,092, filed June 28, 1962.

Heretofore, it has usually been necessary, each time a formation production test was to be made, to discontinue drilling and to withdraw the drill stem, including the drill pipe, drill collar, and drill bit entirely from the borehole, then run into the borehole the desired testing tool, including the string of pipe or tubing by which the testing tool is suspended and manipulated, then perform the testing operation, then withdraw the testing tool and pipe or tubing from the borehole, and finally reinsert the drill stem for resumption of drilling. Thus, for each formation test, it has been necessary to perform two round trips or a cycle of four, time consuming and costly operational steps, and in many present day deep well drilling operations in search of oil and gas at depths often below twenty thousand feet, each of the steps may require several hours, with completion of the whole cycle of steps requiring as much as an entire day or more.

In addition to the costliness of such time consuming testing operations, they have the serious technical disadvantage of making it impossible to test an earth formation promptly following its penetration by the drill, but instead requires such formation to remain exposed to the hydrostatic pressure and attendant infiltration of drilling fluid for a prolong period of time before the test can be made. Such delay and attendant drilling fluid infiltration often vitiates the significance of the test, when finally made, and may also permanently harm the subsequent productivity of the formation.

Also, in addition to the costliness and technical deficiency of the testing systems heretofore usually employed, has been the difficult and uncertain manipulations of the down-hole tools required to be conducted from the extremely remote control location of the top of the well bore.

It is, accordingly, an object of this invention to provide an improved formation testing system, which overcomes the foregoing disadvantage of such testing systems heretofore employed.

It is, similarly, an object of this invention to provide a combined drilling and testing apparatus by means of which, at any time during drilling operations, drilling may be temporarily suspended and, without withdrawal of the drill stem from the borehole, a formation production test can be made.

It is a further object of this invention to provide a combined drilling and testing tool, by means of which a formation production test can be performed substantially immediately upon initial penetration by the drill bit of the formation desired to be tested, thereby reducing the time interval prior to making the test, during which such formation is subjected to the hydrostatic pressure of the drilling fluid in the borehole and the attendant detrimental and contaminating infiltration of drilling fluid.

It is a still further object of this invention to provide means by which, at any time during drilling, the annulus between the drill string and borehole wall can be immediately packed off, thereby isolating the lower portion of the borehole adjacent the drill bit from the upper portion of the borehole, thereby permitting the hydrostatic pressure of the drilling fluid in the borehole to be either removed from the penetrated formation adjacent to the drill bit or, if desired, to be increased by pressurization through the drill pipe as, for example, when it is desired to introduce treating fluids into the previous penetrated formations.

It is an additional object of this invention to provide improved means for accomplishing the foregoing objects, which includes improved and more positive means for the remote manipulation of the drilling and testing tools.

The objects of this invention are attained in general by providing apparatus combining a drill stem and packer device, which packer device remains on the drill stem adjacent the drill bit at all times during drilling operations and which, through manipulation of the drill stem, can be set in sealing engagement with and retracted from engagement with a surrounding borehole wall at any time without the necessity of removal of the drill stem from the borehole being drilled. The objects of this invention are also attained by an improved packer device incorporated in the drill stem structure, and improved control means within the drill stem, adjacent the drill bit, by means of which the foregoing manipulation of the packer device is accomplished.

These and other objects, advantages, and features of novelty will be evident hereinafter.

In the drawings, which show by way of illustration a presently preferred embodiment of the invention and in which like reference characters designate the same or similar parts throughout the several views:

FIGURE 1 is an elevational view of the general assembly of the apparatus of the invention including the drill bit, drill stem and testing tool mechanism, as it appears in drilling position in a typical earth borehole.

FIGURE 2 is an enlarged longitudinal sectional view of the essential portion of the apparatus of FIGURE 1 taken on line 2—2 of FIGURE 1 with portions thereof in elevation, showing the apparatus of the invention as it would appear in position in an earth borehole, with the packer device retracted in condition for drilling.

FIGURE 3 is a view of the same apparatus shown in FIGURE 2 but showing the apparatus as it would appear in an earth borehole with the packer device in set condition for formation testing or treating operations.

FIGURE 4 is a fragmentary longitudinal sectional view of the lower end portion of the apparatus of FIGURES 2 and 3, showing the relative positions of the parts thereof when the apparatus is suspended on the drill pipe as when being run into or withdrawn from the borehole and in condition for by-pass circulation around the drill bit.

FIGURE 5 is a fragmentary perspective view of a portion of an intermediate portion of the apparatus indicated opposite line 5—5 of FIGURE 4, but, for convenience of illustration, with the adjacent upper and lower portion of the tool body removed.

FIGURE 6 is a cross sectional view taken on line 6—6 of FIGURE 5.

FIGURE 7 is a cross sectional view taken on line 7—7 of FIGURE 3.

FIGURE 8 is an enlarged fragmentary, detailed view partly in elevation and partly in longitudinal section of the packer seat portion of the apparatus included within circle 8 of FIGURE 2, showing the packing seat mechanism in retracted condition.

FIGURE 9 is an enlarged fragmentary detailed sectional view of the same apparatus shown in FIGURE 8, but showing the packing seat mechanism in extended condition.

FIGURE 10 is an enlarged fragmentary detailed cross sectional view taken on line 10—10 of FIGURE 9.

The apparatus of the invention is as follows:

Referring in a preliminary manner mainly to FIGURE 1, which shows the general assembly of the apparatus of the invention suspended in an earth borehole 10 in position for performing drilling, testing, or treating operations, as desired, the principal apparatus components thereof respectively from top to bottom are: the lower end portion of a drill pipe string 11, by means of which th apparatus is lowered and suspended in the borehole and by means of which it is rotated for drilling operations by conventional drilling rig apparatus (not shown) at the earth surface; a tester packer section 12a adapted by manipulation of the drill pipe from the earth surface to be set in the borehole to pack off the annular space between the drill stem and borehole wall or to be retracted therefrom; a retractable and extendable barrier or packing seat mechanism 14; a packer setting and retraction control section 16, the mechanism of which is adapted to be actuated by manipulation of the drill pipe, as aforesaid; an elongated drill collar 18 of increased diameter and weight relative to the drill pipe, packer and control sections thereabove; and a drill bit 20 which is herein illustrated as, but is not necessarily limited to, a conventional roller type bit.

Referring again to the drawings, the several components of the apparatus will be described hereinafter in more detail in the same order as hereinafter mentioned.

Referring first to the tester packer section 12a of the apparatus best shown in FIGURES 2 and 3, this section is provided with a central, axially extending, tubular mandrel 22, having an axial fluid passage 24 therethrough and connected at its enlarged upper head end 26 by threads 28 to the pin 30 of a tool joint 32, which is, in turn, connected, in conventional manner to the lower end of the drill pipe 11. The packing sleeve assembly of the tester packer, shown generally at 12, coaxially surrounds the exterior upper portion of the mandrel 22, below the upper head end 26 thereof, and in its normal, retracted, or unexpanded condition, as shown in FIGURES 1 and 2, has an inside diameter sufficient to make a relatively loose, freely rotatable, and longitudinally slidable fit upon the exterior of the mandrel 22, and an outside diameter equal to or preferably slightly less than the outside diameter of the drill pipe and adjacent portions of the tool, so as freely to clear the inside surfaces of the wall of the borehole 10 during drilling operations.

The beforementioned packing sleeve assembly 12 comprises a relatively long, preferably one piece, tubular body composed of suitable resilient material such as, for example, heat and oil resistant synthetic rubber or neoprene, preferably unreinforced by any non-resilient means. The packing sleeve is constructed or preferably treated such as to have a plurality of integrally formed axial zones or sections of alternately relatively higher and lower hardnesses. The sections of relatively higher hardnesses are illustrated at 46 and the sections of relatively lower hardnesses are illustrated at 34, 36 and 38. The materials of the packing sleeve sections 34, 36 and 38 preferably have Shore hardnesses of between approximately 60 Durometer and the sleeve section 46 approximately 80 Durometer.

The upper end portion of the upper packing sleeve section 34 is attached to a packing suspension swivel assembly shown generally at 56, which encircles the upper end portions of the mandrel 22 immediately below the enlarged head end portion 26 thereof, and makes a coaxially rotatable but longitudinally immovable connection thereto, and the lower end of the lower packing sleeve section 36 is similarly attached to a lower packing compression ring member shown generally at 54 which encircles an intermediate portion of the mandrel 22 and is both axially and rotatably slidable thereon.

The packing suspension swivel assembly shown generally at 56 is formed with an upper annular swivel collar 58 having an integrally formed, downwardly extending packing attachment sleeve portion 60 of reduced inside and outside diameter. The packing attachment sleeve 60 extends into and has molded around it and bonded to it the upper annular end portion of the beforementioned upper packing sleeve section 34. The packing attachment sleeve 60 is provided with a plurality of circumferentially spaced-apart radial holes as shown at 62 through which the packing material extends to increase the security of attachment between the swivel connector assembly 56 and the packing sleeve 34.

The packing suspension swivel assembly 56 is rotatably supported on the mandrel 22 by means of a combined radial and thrust ball bearing joint arrangement shown generally at 63, comprising an outer, inwardly facing annular race groove 64 formed in the bore of the swivel collar 58 and a radially opposite, inner, outwardly facing annular race groove 66 formed in the outer surfaces of the mandrel 22, with the annular space thus formed between the inner and outer race grooves 66 and 64 containing a complement of ball bearings 68. An access hole 69 normally closed by a threaded plug 71 (see FIGURE 3) extends radially into the outer race groove 64 and serves for introduction of the bearing balls 68 into the said annular bearing space between the inner and outer race grooves. Annular O-rings seals 70 and 72 are provided between the bore of the swivel collar 58 and the adjacent exterior of the mandrel 22, both above and below the ball bearing 63, which serve to exclude wall fluid from and retain lubricant within the ball bearing swivel joint. The swivel collar 58 is provided with a radial duct 102 having threaded thereinto a lubricant injection attachment fitting 104 for injecting lubricant under pressure into the annular clearance space between the inside surfaces of the packing assembly and the outside surface of the mandrel 22.

The lower packing compression ring member 54 is provided with an integrally formed, upwardly extending packing attachment sleeve portion 70 of reduced inside and outside diameter, similar to the beforementioned upper packing attachment sleeve 60 and which extends into and has molded around it and bonded to it the lower annular end portion of the beforementioned lower packing sleeve section 36. The lower packing attachment sleeve portion 70 is also provided with a plurality of circumferentially spaced-apart radial holes as shown at 72 through which the packing material extends to increase the security of attachment between the packing compression ring 54 and the packing sleeve section 36. The bonding of the surfaces of mutual contact between the packing sleeve sections 34 and 36, and the attachment sleeve portion 60 of the packing suspension swivel assembly 56 and the attachment sleeve portion 70 of the lower packing compression ring 54, is accomplished by suitable means and methods, well known in the art, for tenatiously bonding elastomers of the hereinmentioned kind to metal surfaces.

Immediately below the hereinbefore described packing assembly shown generally at 12 is the hereinbefore mentioned barrier or packing seat mechanism assembly 14, of which the before described lower packing compression ring 54 forms an upper part. As best shown in FIGURES 2, 3, 8, 9, and 10, the packing seat assembly 14 comprises the beforementioned packing compression ring 54, and axially adjacent thereunder a lower annular base member 74 both of which are longitudinally and rotationally slidable on the tubular mandrel 22, relative to the mandrel and longitudinally slidable relative to one another.

Interconnecting the lower end of the packer retainer ring 54 and the upper end of the annular base member 74, are a plurality of normally, longitudinally extending circumferentially spaced-apart scissor-like barrier arm linkages shown generally at 76. Each of the linkages 76 comprises an upper base arm 78 and a lower base arm 80 (see FIGURE 8) hingingly interconnected at their adjacent, intermediate ends by hinge means as shown at 82, and pivotally connected at their opposite upper and lower ends by means of pivot connections 84 and 86, to the lower end of the beforementioned packing compression ring 54 and to the upper end of the beforementioned packing seat base member 74 respectively, such hinged and pivotal connections permitting scissor-like movement of the barrier arm linkages between a retracted position as illustrated in FIGURE 8 and a radially extended position as illustrated in FIGURE 9, upon movement of the packing compression ring 54 and base member 74 axially relative to one another. The pivot connections 84 of the upper barrier arms 78 and the pivot connections 86 of the lower barrier arms 80 are carried by a plurality of circumferentially equally spaced-apart pivot lugs as shown as 88 and 90 respectively, the attachment ends of which extend into correspondingly shaped sockets as shown at 92 and 94 extending endwise into the beforementioned lower end of the packing compression ring 54 and the upper end of the annular base member 74 respectively. After assembly, the barrier arm pivot lugs 88 and 90 may be secured in their respective sockets 92 and 94 by suitable means such as by gas or electric welding.

Each of the upper ones of the barrier arms 78 is formed with an outer, upwardly facing laterally widened slightly convexly curved surface area 96 which, when the arms are in the extended position as shown in FIGURE 8, together present a substantially circumferentially continuous barrier or shoulder in the annular clearance space between the tool and the adjacent surrounding borehole wall, but when retracted lie with the surface areas 96 substantially flush with the cylindrical outside diameter of the adjacent compression ring 54 and base member 74.

Each of the lower base arms 80 is formed with an oblique end surface 81 and a side surface 83 which is complementary to, and when in extended position as shown in FIGURE 9, close into supporting abutments with surfaces 85 and 79 respectively of each of the upper arms 78. An exceeding strong and rigid support is thus provided for the barrier seat surfaces 96 for resisting any down hole packing extrusion which may tend to occur. The outer lower end portion of each of the upper arms 78 is also formed with a sloping surface 75 which is complementary to, and when in retracted position as shown in FIGURE 8, closes into abutment with the side surface 83 of the lower arm 80, thereby limiting the retracting positions of the arms as shown. In such retracted position the pivot points of the intermediate pins 82 is radially outwardly positioned relative to a straight line extending between the end pivot connections 84 and 86, whereby axial force applied through the linkages set up a force couple tending to extend the linkages from the position shown in FIGURE 8 to that shown in FIGURE 9. The bore of the packing compression ring 54 is provided with an inwardly facing sealing ring groove 98 containing an O-ring seal 100 which makes a slidable fluid-tight seal between the packing compression ring 54 and the exterior cylindrical surface of the mandrel 22. The O-ring seal 100 in the packing retainer ring 54, together with the O-ring seals 70 and 72 in the swivel collar 58 serve to exclude well fluid from, and retain lubricant within, the annular clearance space between the inside of the packing assembly and the mandrel 22.

Referring next to the packer control section 16 best shown in FIGURES 2, 3, and 4, this section comprises an outer, axially extending tubular body, shown generally at 106 in FIGURE 1, extending axially over the interval of the apparatus assembly generally indicated at 16 in FIGURE 1, said tubular body comprising an upper tubular section 108 and a lower coaxial tubular section 110 threadedly interconnected at 114 and 116 by an intermediately located, control coupling 112 which will be hereinafter more fully described. The lower threaded end 118 of the lower tubular section 110 makes threaded connection onto the upper end of the pin portion 120 of a tool joint 122 which in turn makes threaded connection at 125 with a tool joint box portion formed integrally on the upper end of the drill collar 18.

The lower end portion 126 of the mandrel 22 extends downwardly longitudinally slidably into the bore of the external tubular body 110, the lower end of such mandrel extention being shown at 124 in FIGURES 2, 3, and 4. The lower end portion 126 of the mandrel 22 is of reduced outside diameter relative to the upper portion thereof, having formed at the juncture between such lower portion of reduced outside diameter and the beforementioned upper portion 126 thereof six, parallel, circumferentially spaced-apart longitudinally extending, spline slots as best shown at 128 and 130 in FIGURE 7. The spline slots 128 and 130 alternate circumferentially with respect to each other, with all of slots 128 being of equal length but greater in length than slots 130 which are also all of equal length. The bottom surfaces of each of the slots is coextensive with and has the same outside diameter as the outside cylindrical surfaces of the lower reduced diameter end portion 126 of the mandrel, and the depths of the slots are such that they are separated by intervening lands 132, the outer surfaces of which are coextensive with and have the same outside diameter as the upper, larger diametered portion of the mandrel 22. The lower ends of the beforementioned lands 132 separating the slots 128 and 130 are formed with diagonally sloping surfaces as shown at 134.

The bore of the beforementioned control coupling 112 has three integrally formed, radially inwardly extending longitudinal splines 136 of such circumferential spacing width, and depth as to enable them to make selective longitudinally sliding inter-engagement either with the beforementioned three spline slots 128 or the three spline slots 130 in the mandrel. The opposite ends of the splines 136 are shaped with beveled end surfaces as shown at 138 and 140.

The lower end of the reduced diameter portion 126 of the mandrel 22 is provided with external threads 142 onto which is threadedly connected a clutch retainer cap member 144. A pair of snap rings 146 which engage an outwardly facing annular groove 148 in the mandrel immediately below the lower end of the cap member 144, serve to lock the retainer cap in position on the end of the mandrel. The retainer cap member 144 is formed with an upwardly facing counter-bore 150 into which extends the cylindrical lower end portion 152 of an upwardly extending coaxial clutch support sleeve 154. The upper end of the clutch support sleeve 154 is formed with six identical, uniformly circumferentially spaced-apart, upwardly extending clutch teeth 156. Each of the clutch teeth 156 is generally saw-tooth shaped, each having one axially directed edge 158 and one diagonal edge 160, the diagonal edge 160 preferably matching in slope that of the beveled lower end edge 140 of the splines 136 in the control coupling 112. The clutch teeth 156 are circumferentially positioned on the mandrel such that each of the axially directed edges 156 thereof lies in a radial plane containing the longitudinal axis of the mandrel and the center line of an axially oppositely positioned spline groove.

The exterior of the clutch support 154 is provided with a pair of axially spaced-apart, outwardly facing, annular seal grooves 162 and 164 containing O-ring seals 166 and 168 respectively and which make axially slidable sealing engagement with the bore of the lower portion 110 of the tubular body 106 into which the mandrel 22 axially slidably extends. The lower end portion 152 of the clutch support 154 is pin-connected at 170 to the lower end of the lower portion 126 of the mandrel to anchor the clutch support and clutch body against rotation relative to the mandrel. An O-ring seal 172 is provided between the mandrel and the cylindrical end portion 152 of the clutch support.

A plurality of fluid flow apertures 174 is provided through the wall of the lower portion 126 of the mandrel 22, one each of such apertures being positioned adjacent the lowermost portion of each notch formed between the before-described clutch teeth 156, such apertures being provided for the ingress or egress of fluid into or from the bore of the mandrel during testing or treating operations, as will be hereinafter more fully described. The lower section 110 of the tubular body 106 is provided with a plurality of ports 176 extending radially through the walls thereof and which are positioned below the lower end 124 of the lower portion 126 of the mandrel when the mandrel 22 is in its uppermost location relative to the packer control section, as shown in FIGURE 4, and which ports 176 are located above the upper O-ring seal 168 in the clutch support 154 and in communication with the apertures 174 in the mandrel when the mandrel is in its lowermost position relative to the packer control section 16 and tubular body 106 as shown in FIGURE 3, and which ports are located axially intermediate the O-ring seals 166 and 168 and are thus shut off from communication with the interior of the mandrel by the clutch support 154 when the mandrel is in an intermediate position relative to the packer control section 16 and the tubular body 106 as shown in FIGURE 2.

The upper end portion of the upper tubular section 108 is provided with an O-ring seal 111 which makes sliding sealing engagement with the adjacent external surface of the mandrel 22.

The operation of the hereinbefore described apparatus of the invention is as follows:

As beforementioned, the mandrel 22 is axially slidable within the bore of the tubular body 106 which consists of the upper tubular section 108, the lower tubular section 110 and the intermediate interconnecting control coupling 112, and in the normal running-in condition of the apparatus, that is, when the apparatus is being lowered into a well borehole, mandrel 22 occupies an elevated position relative to the tubular body 106 approximating that shown in FIGURE 4 in which the cutch, carried by the mandrel including the clutch teeth 156, are correspondingly elevated to a maximum upper position relative to the tubular body 106 in which they engage supportingly the lower ends of the splines 136 of the control coupling 112. Under such conditions, the distance between the top end 109 of upper tubular portion 108 of the tubular body 106 and the swivel collar 58 is a maximum, and the packing assembly 12 is in its most elongated and completely retracted condition, and with the lower end 108 of the packing seat base member 74 separated from and suspended above the top end 109 of the tubular body 108 as shown in FIGURE 4.

When the mandrel 22 occupies its most fully lowered position relative to the tubular body 106 as permitted and limited by the entrance of the splines 136 of the control coupling 112 into the longest ones of the splined grooves 128 in the mandrel, the mandrel will occupy a position within the control section of the apparatus as shown in FIGURE 3, and the axial distance between the swivel collar 58 and the lower packing compression ring 54 and the bottom end 107 of the packer seat base member 74 being lowered into forceful abutment with the top 109 of the upper section 108 of tubular body 106, resulting in compression of the packing assembly comprising the packing sleeve sections 34, 36, and 38 as aforesaid and the radial extension of the barrier arm linkages 76 into position adjacent to or in engagement with the wall of the surrounding borehole, as shown in FIGURE 3.

When the mandrel 22 is elevated to an intermediate position within the tubular body 106 as permitted and liimted by the positioning of the splines 136 of the control coupling 112 in the shorter ones of the spline grooves 130 of the mandrel with the upper ends of the splines 136 in abutment with the upper ends of the spline grooves 130, then the mandrel will occupy a position within the control section of the apparatus as shown in FIGURE 2 in which the axial distance between the swivel collar 58 and the top 109 of the upper sections 108 of tubular body 106 will have been accordingly shortened just sufficient to bring the lower end 107 of the packer seat base member 74 closely adjacent to or into light abutment with the top 109 of the upper section 108 of tubular body 106, but with insufficient force to displace the barrier arm linkages 76 or to expand any of the packing sections 34, 36, or 38, from their fully retracted positions. Under the latter conditions the weight of the packing assembly will be substantially suspended in tension from the swivel collar 58 and the apparatus is in condition for carrying on drilling operations with the packing in retracted or unset condition, out of contact with the borehole wall.

Now, for convenience of description of the operation of the apparatus, let it be assumed that the earth borehole 10 has been previously drilled to the depth illustrated in FIGURE 1, and it is now desired to reinsert the drill string, including the apparatus of this invention, into the borehole 10 for resumption of drilling. For this purpose, the apparatus is assembled and the various parts thereof will initially assume the relative positions illustrated in FIGURES 1 and 4 when the apparatus is suspended on the drill pipe 11 in the borehole, in which condition the mandrel 22 and tubular body 106 will occupy axial positions relative to one another as determined by the sealing of the lower diagonal ends 134 of the splines 136 of the control coupling 112 in the correspondingly shaped bottoms between the clutch teeth 156 as shown in FIGURE 4. In this latter position, during suspension and running-in of the tools, the mandrel 22 is in its most upwardly elevated position relative to the tubular body 106 and control section 16 of which it comprises a part, and the weight of the control section 16 drill collar 18, and drill bit 20 is suspended therethrough on said splines 136 which are seated in the bottoms of the clutch teeth 156 as beforementioned, and the packing sleeve sections 34, 36 and 38 are in their maximum axially elongated, radially retracted conditions, as shown in FIGURE 4.

Under the preceding initial conditions, the drill string including the apparatus of this invention, is lowered into the borehole 10 to the position illustrated in FIGURE 1 at which the drill bit 20 is brought into contact with the bottom of the borehole in readiness for drilling. When the drill bit 20 makes contact with the bottom of the borehole 10 and some of the weight of the drill pipe is applied, the control section 16 including the tubular body 106 will be supported against further downward movement, but the mandrel 22 will be free to continue downward movement within the tubular body 106 for a limited distance. Such downward movement of the mandrel 22 relative to the tubular body 106 will cause the clutch teeth 156 and the spline grooves 128 and 130 to be moved downwardly relative to the splines 136 in the control coupling 112 until the splines 136 are removed from engagement with the clutch teeth 156 and the upper beveled ends 138 of the splines 136 are brought into engagement with certain of the diagonal ends 134 of the spline groove lands 132 under which conditions the control coupling 112 and the mandrel 22 will thereby be rotationally displaced relative to one another a distance sufficient to allow one set of the splined grooves, either grooves 128 or grooves 130, to move down into engagement with the splines 136 depending upon which set of grooves happen to be axially opposite the splines 136 at the time. In movement of the spline grooves 128 and 130 and the splines 136 from their relative positions as shown in FIGURE 4, in the manner just described, the shorter set of splines 136, with the top ends 138 of splines 136 finally occupying a position in abutment with the top ends of the splined grooves 130 as illustrated in FIGURE 2. Under the latter condition, the packing assembly 12 together with the barrier or packing seat assembly 14, will be lowered relative to the tubular body 106 just sufficient to bring the bottom end 107 of the packer seat base member 74 closely adjacent to or in light contact with the top end 109 of the upper tubular section 108 of the tubular body 106, in which situation insufficient axial compression will be applied through the packing section 12 and the packing seat section 14 to affect any appreciable expansion of the packing sleeve sections 34, 36 and 38. The weight from the drill string 11 may then be applied from the mandrel by way of the splines 136 and top ends of spline grooves 130 to the drill bit 20 sufficient for drilling, and circulation of drilling fluid may then be started and rotation imparted to the drill stem for performance of the drilling operations, and such drilling weight will maintain the splines 136 of the control coupling 112 securely engaged within and seated against the upper ends of the shorter spline slots 130 during such drilling. In this drilling position the ports 176 in the tubular body 106 are located between the O-ring seals 166 and 168 in the clutch support sleeve 154 and are thereby shut off from communication with the interior of the mandrel 22 and the drill string. Meanwhile, during such drilling, the packing sleeve sections 34, 36 and 38 and the packing seat arm linkages 76 remain retracted, out of contact with the surrounding borehole wall, the inside diameter of the surrounding borehole wall being substantially greater than the outside diameter of the packing sleeves and the retracted members of the packing seat 14. However, by reason of lateral bending or occasional whipping action of the drill stem during drilling, or possibly due to some irregularities of the borehole wall, or presence of drilling debris therein, the packing sleeve sections may occasionally come into frictional contact with the borehole wall or such debris during drilling rotation of the tools. When this occurs, the packing sleeve 12 and the packing seat assembly 14, because of their freedom to rotate relative to the mandrel 22 on the hereinbefore described swivel collar 58, will not be forced to rotate relative to the formation, but will remain rotationally stationary relative to the formation so long as any such contact between the packing or the packing seat mechanism 14 and the borehole continues. Possible damage to the packing and to the packing seat mechanism is thus minimized.

Lubricant introduced through the fitting 104 into the clearance space between the inside surface of the packing sleeve 12 and the outside surface of the mandrel 22 serves to reduce friction and thereby to increase and maintain the freedom of the packing sleeve to rotate on the mandrel 22 as aforesaid, and also assists in maintaining conditions favorable to proper axial setting and release of the packing sleeve sections as occurs in connection with the formation testing or treating operations, as hereinafter described.

When it is desired to make a formation test, drilling rotation of the drill pipe is temporarily interrupted, and the drill pipe is hoisted upwardly in the borehole a sufficient distance to remove all of the weight from the drill bit, and again to raise the clutch teeth 156 upwardly into engagement with the bottom ends 140 of the splines 136 of the control coupling 112, thereby causing the splines 136 to again be rotationally displaced relative to the spline grooves in the mandrel by an angular amount subtended, by the width of one clutch tooth, such that when the mandrel is again lowered relative to the tubular body 106, the spline grooves 128 in the mandrel and the splines 136 in the control coupling 112 move together such that the longer ones of the spline grooves 128 engage the splines 136 and move axially together until the top ends 138 of the splines 136 and the top ends of the spline grooves 128 are positioned adjacent one another, but not necessarily in contact with one another, as shown in FIGURE 3. Under the latter conditions, the swivel collar 58 will have been moved downwardly relative to the top 109 of the upper section 108 of the tubular body 106 an additional distance, as permitted by the longer spline grooves 128, sufficient to bring the lower end 107 of the packer seat base member 74 into forceful contact with the aforesaid top 109 of the upper section 108 of the tubular body 106, with the distance therebetween being sufficiently reduced to compress the packing sleeve sections 34, 36 and 38 and to the packing seat assembly axially sufficiently to cause them to expand radially into engagement with the surrounding wall of the borehole 10, as illustrated in FIGURE 3. The forces thus applied axially from the drill and the mandrel 22 to the packer sleeves 34, 36 and 38 and to the packing seat mechanism 14, necessary for setting the packing, as before mentioned, are transmitted from the drill pipe 11 and the upper enlarged head end 26 of the mandrel 22 through the swivel collar 58 and thence through the packing sleeve assembly 12, the packing compression ring 54, through the packing seat mechanism 14 to the packer seat base member 74 and from there through the tubular body 106, drill collar 18, and the drill bit 20 to the bottom end of the borehole 10. The limit of such axial compression and resultant radial expansion of the packing sleeve 12 and the packing seat mechanism would be determined by the abutment of the upper ends 138 of the splines 136 of the control coupling 112 with the upper ends of the long spline grooves 128 of the mandrel.

It will be noted that repeated raising and lowering of the mandrel carrying the spline grooves 128 and 130 and clutch teeth 156 into alternating engagement with the bottom and top ends of the splines 136 will result in stepwise rotation of the mandrel 22 and the tubular body 106 relative to one another to any of the rotational positions required for drilling, testing or by-pass circulation, as hereinbefore described.

With the mandrel 22 positioned within the tubular body 106 as hereinbefore described and shown in connection with FIGURE 3, the ports 176 which extend through the tubular body 106 will have been brought into communication with the space surrounding the reduced outside diameter portion 126 of the mandrel which extends between the clutch teeth 156 and the spline grooves 128 and 130, and between the O-ring seals 168 and 111, thereby in turn bringing the ports 176 into communication with the fluid flow apertures 174 which extend through the mandrel walls into the interior of the mandrel.

If it is desired to make a formation test, following the setting of the tester packing section 12 into sealing engagement with the wall of the borehole 10 and the positioning of the ports 176 in the tubular body 106 into communication with the fluid flow apertures 174 in the mandrel, as before described, and as illustrated in FIGURE 3, a bailer or swab may then be run on a wire line into the drill pipe and sufficient drilling fluid thereby removed from the drill pipe to lower the fluid pressure in the bottom of the well borehole below the set packing sleeve 12 to permit formation fluids to enter the borehole. A sample of such formation fluids may be then obtained by running in a fluid sampling device or a wire line or by continued bailing or swabbing until such fluids are elevated to the top of the drill pipe, and in some cases, where the formation fluid pressures are sufficiently high, productive flow conditions may thus be induced.

Instead of bailing or swabbing to remove drilling fluid from the drill string to reduce the hydrostatic pressure in the bottom of the borehole, as hereinbefore described, before setting the packing elements, a following plug or separator can be introduced into the top end of the drill pipe and pumped down therethrough by means of suitable fluid or gas under sufficient pressure to force drilling fluid out of the drill string, through the bit, and upward through the annular space between drill stem and borehole and out of the top of the well. When it is determined that sufficient drilling fluid has thus been displaced from the drill string, then the packing elements may be set, following which the gas previously introduced into the top of the drill pipe may be released or exhausted, thereby reducing the fluid pressure in the bottom of the drill string and bottom of the borehole sufficiently to permit formation fluid to enter the borehole as before described.

When it is desired to discontinue testing, the drill pipe is raised sufficiently to disengage the splines 136 from the spline grooves 128 at which relative position between the mandrel 22 and the tubular body 106, the packing sleeves 34, 36 and 38 and the packing seat mechanism 14 will have been permitted to return to their fully elongated and retracted shapes, as shown in FIGURES 1 and 2, and under such conditions, the fluid previously supported in the borehole annulus above the set packer sleeve assembly 12 is released to flow downwardly between the borehole walls and the drill string to re-establish the fully hydrostatic head of the borehole fluid in the bottom of the borehole against the formation and thereby kill any further production of formation fluids.

In event, for any reason, difficulties are had in performing the latter operation of retracting the packing sleeve assembly from its expanded set condition drilling fluid under pressure may be introduced into the top of the drill string and pressure applied thereby down through the drill bit to the bottom of the borehole 10 below the packing sleeve, thereby re-establishing the necessary fluid pressure in the bottom of the borehole required to kill production, if any, and to facilitate release of the set packing. In the further event that the drill bit becomes plugged and circulation cannot be re-established normally through the drill string and out through the drill bit, the drill pipe may be hoisted sufficiently to raise the mandrel upward relative to the tubular body 106 sufficiently again to bring the bottom ends of the splines 136 into bottoming engagement with the bottoms of the clutch teeth 156 as shown in FIGURE 4 under which relative positions of the mandrel 22 and the tubular body 106, the ports 176 through the tubular body 106 are positioned below the lower end 124 of the lower end portion 126 of the mandrel 22, thereby placing the bore of the mandrel in by-pass communication with the borehole annulus, exterior to the tubular body 106. Under this latter condition borehole fluid may then be pumped down the drill pipe, out through the lower end of the mandrel, through the ports 176 into the borehole annulus and thence up through the borehole annulus to the top of the borehole, thereby re-establishing borehole circulation and occasionally thereby assisting in remedying a stuck condition of the tools in the well.

If, instead of making a formation production test, as hereinbefore described, it is desired to treat the drilled pervious formations adjacent the bottom of the well borehole 10 with treating fluids, such as for example, acid, the packer apparatus of this invention may be manipulated and sent in the same manner as hereinbefore described preparatory to the making of a formation test. However, instead of performing any of the formation sampling steps and before the packing is set, the treating fluid may be introduced down through the drill pipe under pressure sufficient to displace the drilling fluid downwardly therethrough and up the borehole annulus. When the treating fluid has thus been introduced through the drill string in sufficient quantity to approximately reach the bottom end of the drill string, that is, reach the drill bit 20, then the packing sleeve may be set in sealing engagement with the surrounding well borehole in the manner hereinbefore described, while maintaining the treating fluid pressure within the drill stem, and then, after the packing sleeve sections are set, the treating fluid pressure may be increased through the drill pipe sufficient to force it either out through the drill bit 20 or out through ports 176, into the bottom of the borehole 10 and cause it to penetrate, the surrounding pervious formations.

In withdrawing the apparatus of the invention from the well borehole following either a formation test, treating operation, or a period of drilling as hereinbefore described, the drill pipe is hoisted upwardly with the result that the mandrel 22 is drawn upwardly relative to the packer control section 16 and tubular body 106, thereby moving the clutch teeth 156 upwardly sufficiently to withdraw the splines 136 of the control coupling 112 out of whichever of the spline grooves 128 or 130 previously occupied, and to move the clutch teeth 156 into engagement with the lower ends of the splines 136 to the position shown in FIGURE 4, under which condition the packing sections 34, 36 and 38 of the packing assembly 12 and the packing seat mechanism 14 are again retracted and the drill collar 18 and drill bit 20 are again suspended from the drill pipe. The drill stem including the apparatus of this invention may then be either withdrawn from the borehole or drilling, testing or treating may be resumed in the manner before described.

The construction of the packing assembly portion 12 of the apparatus of this invention, such as to have a plurality of integrally formed or attached axial packing zones or section of alternatingly different hardnesses as hereinbefore described, has been found to result in a packing sleeve which, because of the greater yield of the softer sections relative to the harder sections thereof, assumes an annularly convoluted or bellows-like, radially extended shape when compressed axially, having a so-called caterpillar appearance as illustrated in FIGURE 3. This form of packing has been found to be advantageous in resisting the high differential fluid pressures thereacross attendant upon setting of the packing and reducing the fluid pressure in the bottom of the hole when making a formation test as hereinbefore described. The barrier or packing seat mechanism 14 has also been found to be important in resisting the tendency of the packing material to extrude downwardly in the annulus between the tool and the borehole wall below the packing, which otherwise may occur under the extremely high pressure and high temperature borehole conditions occasionally encountered in deep wells.

The packer sleeve may be composed of an elastomer sold under the trade name of Hycar. For a packing sleeve having an outside diameter of approximately six inches in its retracted condition, it has been found that an overall length of approximately seven feet and wall thicknesses of approximately one inch are satisfactory for effective action as hereinbefore described.

While a preferred embodiment of the invention has been herein shown and described, which is capable of fulfilling the objects and the advantages sought, it is to be understood that modifications and variations may be made thereto by those skilled in the art without departing from the scope of the invention, as defined by the appended claims.

What is claimed is:

1. In a tool adapted to be run into an earth borehole on a drill string, apparatus comprising:
 slip joint means including;
 a pair of concentric coupling elements which are longitudinally telescopically slidable relative to one another, one of such coupling elements being adapted to be fixedly connected to a drill stem portion thereabove and the other of said coupling elements being adapted to be fixedly connected to a drill stem portion therebelow;
 interlocking means for said coupling elements permitting limited longitudinal shortening and lengthening telescopic sliding movement thereof resulting from longitudinal shortening and lengthening movement of said drill stem portions relative to one another, said coupling elements including means operative by such sliding movements to induce rotation of said elements relative to one another in successive, stepwise angular rotational movements each such stepwise angular rotational movement being in response to each such shortening and lengthening movements of said coupling elements;

tool means connected to said slip joint means and operable to place elements of said tool means alternately in first and second conditions in said borehole;

and means actuatable by such stepwise telescopic slidable shortening and lengthening movements and controlled by such stepwise angular rotational movemets of said coupling elements relative to one another, to operate said tool as aforesaid, to place said elements of said tool alternately in said first and second conditions.

2. In a tool adapted to be run into an earth borehole on a drill stem, apparatus comprising:

slip joint means including:

a pair of concentric coupling elements which are longitudinally telescopically slidable relative to one another, one of such coupling elements being adapted to be fixedly connected to a drill stem portion thereabove and the other of said coupling elements being adapted to be fixedly connected to a drill stem portion therebelow;

interlocking means for said coupling elements limiting the longitudinal shortening and lengthening telescopic slidable movement of said coupling elements relative to one another resulting from longitudinal shortening and lengthening movements of said drill stem portions relative to one another and normally preventing continuous rotation thereof relative to one another;

an elongated, resilient packing body for surrounding the exterior of a drill stem portion adjacent said slip joint;

means actuable by telescopic slidable shortening movement of said coupling elements relative to one another in excess of a predetermined amount, for compressing said packing body longitudinally and thereby expanding said packing body laterally into sealing engagement with a surrounding borehole wall;

and control means included in said slip joint means actuatable by longitudinal reciprocatory telescopic sliding movements of said coupling elements relative to one another, to induce movements of said coupling elements relative to one another such as alternately successively first to couple said slip joint elements in nonrotatable relation to one another with said shortening movement limited thereby to less than said predetermined amount, such as to permit transmission of rotation and longitudinal force therethrough from such drill stem portion thereabove to such drill stem portion therebelow while preventing such compressing of said packing body by such force, and second to couple said slip joint elements in nonrotatable relation to one another with said shortening movement unlimited thereby to less than said predetermined amount, such as to permit transmission of rotational and longitudinal force from such drill stem portion thereabove to such drill stem portion therebelow while permitting such compression of said packing body by such force.

3. Apparatus in accordance with claim 2 in which said control means comprises:

a set of a plurality of circumferentially equally spaced-apart, parallel, longitudinally extending, spline grooves fixed to one of said coupling elements, circumferentially adjacent ones of said spline grooves being alternately, longitudinally longer and shorter relative to one another and open at circumferentially adjacent ends for sliding engagements thereinto of a follower spline means;

a set of a plurality of circumferentially equally spaced-apart, generally parallel, longitudinally extending spline teeth, fixed to the same said one of said coupling elements, said spline teeth being of equal length relative to each other and open therebetween at circumferentially adjacent ends for sliding engagement thereinto of said follower spline means;

the circumferentially adjacent open ends of said spline grooves being positioned in longitudinally spaced-apart, oppositely confronting positions relative to the openings between said spline teeth and with the spline grooves rotationally staggered relative to said openings between said spline teeth;

and a follower spline means, as aforesaid fixed to the said other of said coupling elements and reciprocable by the aforesaid intermittent longitudinal reciprocatory telescopic sliding movements of said coupling elements relative to one another, alternately into engagement with said spline grooves and the said openings between said spline teeth;

the confronting ends of said spline grooves and said spline teeth being bevelled, and the longitudinally opposite ends of said spline means being bevelled, such that upon each such longitudinal reciprocatory movement of said follower spline means alternately into engagement with said spline grooves, and said spline teeth, the bevels thereof alternately engage one another in such manner as to cause stepwise rotation of said follower spline means and said spline grooves and teeth relative to one another, such that said follower spline means alternately, couplingly enters the short spline grooves and the long spline grooves, thereby alternatingly permitting longitudinal movement of said coupling elements together relative to one another less than said predetermined amount and greater than said predetermined amount respectively.

4. Apparatus in accordance with claim 2 in which said control means comprises:

a set of an even numbered plurality of circumferentially equally spaced-apart, parallel, longitudinally extending, spline grooves in one of said coupling elements, circumferentially adjacent ones of said spline grooves being alternately, longitudinally longer and shorter relative to one another and open at circumferentially adjacent ends for sliding engagements thereinto of the splines of a follower spline means;

a set of an even numbered plurality of circumferentially equally spaced-apart, generally parallel, longitudinally extending spline teeth fixed to the same said one of said coupling elements, said spline teeth being of equal length relative to each other and open therebetween at circumferentially adjacent ends for sliding engagement thereinto of said follower spline means;

the circumferentially adjacent confronting open ends of said spline grooves being positioned in longitudinally spaced-apart, oppositely confronting positions relative to the opening between said spline teeth and with the spline grooves rotationally staggered relative to said openings between said spline teeth;

and a follower spline means fixed to the said other of said coupling elements as aforesaid, said spline means having a number of longitudinally extending splines thereon equal to one half the number of said spline grooves, said spline means being reciprocable by the aforesaid intermittent longitudinal reciprocatory telescopic sliding movements of said coupling elements relative to one another, alternately into engagement with said spline grooves and the said openings between said spline teeth;

the confronting ends of said spline grooves and said spline teeth being bevelled in opposite directions, and the longitudinally opposite ends of said splines of said follower spline means being bevelled in opposite directions, such that upon each such longitudinal reciprocatory movement of said splines of said follower spline means, alternately into engagement with said spline grooves and said spline teeth, the bevels thereof alternately engage one another in such manner or to cause stepwise rotation of said follower spline means and said spline grooves and teeth relative to one another, such that the splines of said follower spline means alternately, couplingly enters the short spline grooves and the long spline grooves, thereby alternatingly permitting movement of said coupling elements longitudinally together relative to one another less than said predetermined amount and greater than said predetermined amount respectively.

5. Apparatus according to claim 4 and a bypass valve means interconnecting the interior and exterior of said drill stem portion below said packing body, said bypass valve being opened by longitudinal displacement of said coupling elements such as to effect compression of said packing body and closeable upon longitudinal displacement of said coupling elements such as to release said packing body from such compression, as aforesaid.

6. In a tool adapted to be run into an earth borehole on a drill stem, apparatus comprising:
   slip joint means said slip joint means including;
   a pair of concentric coupling elements which are longitudinally telescopically slidable relative to one another, one of such coupling elements being adapted to be fixedly connected to a drill stem portion thereabove and the other of said coupling elements being connected to a lower drill stem portion therebelow;
   a drill bit connected to the lower end of said lower drill stem portion;
   interlocking means for said coupling elements limiting the longitudinal shortening and lengthening telescopic slidable movement of said coupling elements relative to one another resulting from such longitudinal shortening and lengthening movements of said drill stem portions and normally preventing continuous rotation thereof relative to one another;
   an elongated, resilient packing body surrounding the exterior of a drill stem portion adjacent said slip joint;
   means actuable by telescopic slidable shortening movement of said coupling elements relative to one another in excess of a predetermined amount, for compressing said packing body laterally for sealing engagement with a surrounding borehole wall;
   and control means included in said slip joint means actuable by intermittent longitudinal reciprocatory telescopic sliding movements of said coupling elements relative to one another, to induce movements of said coupling elements relative to one another such as alternately successively first to couple said slip joint elements in nonrotatable relation to one another with said shortening movement limited thereby to less than said predetermined amount, such as to permit transmission of rotation and longitudinal force therethrough from such drill stem portion thereabove to said drill bit therebelow while preventing such compressing of said packing body by such force, and second to couple said slip joint elements in nonrotatable relation to one another with said shortening movement unlimited thereby to less than said predetermined amount, such as to permit transmission of longitudinal force from such drill stem portion thereabove through said packing body to said drill bit therebelow and thereby causing such compression of said packing body by such force.

7. In a tool adapted to be run into an earth borehole on a drill stem, apparatus comprising:
   slip joint means including;
   a pair of concentric coupling elements which are longitudinally telescopically slidable relative to one another, one of such coupling elements being adapted to be connected to a drill stem portion thereabove and the other of said coupling elements being connected to a lower drill stem portion therebelow;
   a drill bit connected to the lower end of said lower drill stem portion;
   interlocking means for said coupling elements limiting the longitudinal shortening and lengthening telescopic slidable movement of said coupling elements relative to one another and normally preventing continuous rotation thereof relative to one another;
   an elongated, resilient packing body surrounding the exterior of a drill stem portion adjacent said slip joint;
   bearing means supporting said packing body upon said drill stem portion, whereby said packing means is rotatable relative thereto when said packing is retracted;
   means actuatable by telescopic slidable shortening movement of said coupling elements relative to one another in excess of a predetermined amount, for compressing said packing body longitudinally for expanding same from such retracted position into surrounding borehole wall;
   and control means included in said slip joint means actuatable by intermittent longitudinal reciprocatory telescopic sliding movements of said coupling elements relative to one another, alternately successively, first to couple said slip joint elements in nonrotatable relation to one another with said shortening movement limited thereby to less than said predetermined amount, such as to permit transmission of rotation and longitudinal force therethrough from such drill stem portion thereabove to said drill bit therebelow while retaining said packing body in retracted position, and second to couple said slip joint elements in nonrotatable relation to one another with said shortening movement unlimited thereby to less than said predetermined amount, such as to permit transmission of longitudinal force from such drill stem portion thereabove through said packing body to said drill bit therebelow and thereby causing such compression of said packing body by such force.

8. Apparatus according to claim 7 which said packing body comprises:
   at least a pair of resilient, coaxial sleeve members, said sleeve members being attached in end-to-end relation to one another by means of intermediate, coaxial, annular metal members to which the end portion of said sleeve members are bonded, whereby intermediate portions of said packing body are circumferentially restrained but resiliently slidably movable relative to one another.

9. Apparatus according to claim 8, and a metal annular end member coaxially attached to each opposite end of said packing body, said annular end members and intermediate members being rotatably retained on said drill stem portion upon which said sleeve members are mounted as aforesaid.

10. Apparatus according to claim 9 and swivel coupling means to restrain the upper one of said annular end members from axial sliding movement on said drill stem portion.

11. Apparatus according to claim 10 and duct means in one of said annular end members for introducing lubricant under pressure from the exterior thereof into the space intermediate said sleeve members and said drill stem portion upon which said sleeve elements are mounted.

12. In a tool adapted to be run into an earth borehole on a drill stem, apparatus comprising:
   a mandrel;
   a thrust bearing adjacent the top end portion of said mandrel;

a packing sleeve coaxially surrounding said mandrel and axially fixed adjacent its top end, and rotatably suspended from its top end by means of said thrust bearing when said packing sleeve is in retracted condition;

a slip joint means in an intermediate portion of said mandrel including a pair of axially telescopically slidable coupling elements, one of said elements being connected to said thrust bearing above the top end of said packing sleeve, and the other of said elements being connected to a packing compression sleeve below the lower end of said packing sleeve;

whereby axial telescopic sliding movement of said coupling elements together in excess of a predetermined amount compressor said packing sleeve axially between said thrust bearing and said packing compression sleeve;

interlocking means included in said coupling elements limiting the axial lengthening and shortening telescopic sliding movements thereof relative to one another; and actuatable by intermittent longitudinal telescopic movements of the said coupling elements relative to one another by axial movement of the portion of the said mandrel attached thereto, successively alternatingly to;

couple said coupling elements in nonrotatable relation to one another with shortening movement therebetween limited to less than the aforesaid predetermined amount, such as to permit transmission of rotation and axial compressive force through said mandrel while retaining said packing sleeve in free uncompressed suspension from said thrust bearing, and to couple said coupling elements in nonrotatable relation to one another with shortening movement therebetween in excess of the aforesaid predetermined amount, such as to permit transmission of rotational force through said mandrel and axial force through said packing sleeve between said thrust bearing and said packing compression sleeve;

packing extrusion barrier means on said mandrel intermediate the lower end of said packing sleeve and the upper end of said packing compression sleeve, said barrier means including metal barrier members and means for projecting and retracting said barrier members into and from an annular space adjacent the lower end of said packing sleeve;

and a bypass valve means for interconnecting the fluid passage in said mandrel with the space exterior of said mandrel in a borehole below said packing sleeve both when the shortening telescopic sliding movement between said coupling elements is either at the minimum as limited thereby, or in excess of the aforesaid predetermined amount at which compressive force is transmitted through said packing sleeve.

13. A packer body comprising:

an elongated resilient, sleeve member, said sleeve member having a plurality of axial zones in end-to-end relation of resilient alternately increased and decreased hardnesses relative to each other, whereby, when said sleeve member is compressed axially, said alternate zones of said packing body are circumferentially alternately restrained and expanded in different amounts, thereby tending to form a generally tubular shaped packing body having a plurality of coaxial, axially spaced convolutions when compressed axially as aforesaid;

and a metal annular end member bonded to each of the outer ends of the end-most ones of said zones of said sleeve member.

14. A packer body according to claim 13 in which one of said metal annular end members includes a swivel connector means adapted to connect the end of said packing body rotatably, but non-slidable axially to a coaxial mandrel member.

15. Apparatus in accordance with claim 13 and normally retracted barrier means mounted adjacent and normally suspended by the lower end of said packing body and extendable laterally of the packing body to resist axial extrusion thereof, in response to axial compression force applied thereto through said packing body.

16. Apparatus in accordance with claim 15 in which said barrier means includes:

an upper sleeve member connected coaxially to the lower end of said packing body;

a lower sleeve member positioned coaxially with said upper sleeve member and coaxially slidable relative thereto;

a plurality of scissor like linkages axially movably interconnecting said upper and said lower sleeve member, each of said linkages including;

an upper barrier arm and a lower brace arm, said barrier arm and said brace arm being pivotally interconnected by a central pivot at their adjacent intermediate ends and pivotally connected at their opposite ends by end pivots to said upper sleeve member and said lower sleeve member respectively, said central pivot being positioned laterally outward of a straight line passing through said end pivots when said scissor-like linkage is in fully retracted position;

whereby when said lower sleeve member is suspended by said linkage, in tension, from said upper sleeve member, when no compressive force is applied through said packing body, a force couple is resultingly applied to said linkage tending to retain it in retracted position, and when axial compressive force is applied through said linkage from said upper sleeve member to said lower sleeve member, when compressive force is applied through said packing body, a force couple is resultingly applied to said linkage tending to pivot it into laterally extended extrusion-resisting position below the lower end of said packer body.

17. Well borehole packing extrusion barrier means comprising:

an upper sleeve member;

a lower sleeve member positioned coaxially with said upper sleeve member and coaxially slidable relative thereto;

a plurality of scissor like linkages axially movably interconnecting said upper and said lower sleeve member, each of said linkages including;

an upper barrier arm and a lower brace arm, said barrier arm and said brace arm being pivotally interconnected by a central pivot at their adjacent intermediate ends and pivotally connected by end pivots at their opposite ends to said upper sleeve member and said lower sleeve member respectively, and said pivots being arranged for lateral swinging movement of said arms relative to longitudinal axis of the sleeve members, and said central pivot being positioned laterally outward of a straight line passing through said end pivots at all positions of said scissor-like linkage between extended and fully retracted positions;

whereby when tension is applied through said linkage between said upper sleeve member and said lower sleeve member, a force couple is resultingly applied to said linkage tending to move and retain it in retracted position, and when axial compressive force is applied through said linkage between said upper sleeve member and said lower sleeve member, a force couple is likewise resultingly applied to said linkage tending to pivot it into laterally extended position.

18. Apparatus in accordance with claim 17 in which:

said upper barrier arm is formed with an outer circumferentially widened cylindrically convex barrier surface and an inner circumferentially relative narrow connector portion, the inner end of which is pivotally connected to the lower end edge portion of said upper sleeve member;

whereby when said upper barrier arms are in laterally extended positions, the barrier surfaces thereof together present an upwardly forcing, substantially annular area extending laterally beyond the outside diameters of said sleeve members, and when said barrier arms are in longitudinally retracted positions the barrier surfaces prevent a substantially continuous, outwardly facing, cylindrical surface between and substantially flush with the outside diameters of said upper sleeve member and said lower sleeve member.

19. Apparatus in accordance with claim 18 in which: the outer end portions of said upper barrier arm is formed on its lower inner side intermediate its central pivot and inner end pivot with a diagonally inwardly directed surface, and the outer end portion of said lower brace arm is formed with an upper surface intermediate its central pivot and inner end pivot, which surfaces when said barrier arm and said brace arm are in maximum extended position, make abutting engagement with one another, such as to limit further pivoted scissor-like folding movement of said arms relative to one another about said central pivot, and whereby said brace arm acting through such mutually abutting surfaces braces said barrier arm in fully extended position.

20. Well borehole packing extrusion barrier means comprising:
 an upper sleeve member;
 a lower sleeve member positioned coaxially with said upper sleeve member and coaxially slidable relative thereto;
 a plurality of scissor like linkages axially movably interconnecting said upper and said lower sleeve member, each of said linkages including;
 an upper barrier arm and a lower brace arm, said barrier and said brace arm being pivotally interconnected by a central pivot at their adjacent intermediate ends and pivotally connected by end pivots at their opposite ends to the lower end edge of said upper sleeve member and to the upper end edge of said lower sleeve member respectively for lateral swinging movement relative to the longitudinal axis of the sleeve members, said central pivot being positioned laterally outward of a straight line passing through said end pivots at all positions of said scissor-like linkage between and inclusive of fully extended and fully retracted positions;
 whereby when tension is applied through said linkage between said upper sleeve member and said lower sleeve member, a force couple is resultingly applied to said linkage tending to move and retain it in retracted position, and when axial compressive force is applied through said linkage between said upper sleeve member and said lower sleeve member, a force couple is likewise resultingly applied to said linkage tending to pivot it into laterally extended position.

References Cited by the Examiner
UNITED STATES PATENTS

| | | | |
|---|---|---|---|
| Re. 24,236 | 11/1956 | Bedingfield | 166—196 |
| 2,178,540 | 11/1939 | McNeese et al. | 166—142 |
| 2,207,019 | 7/1940 | Linville | 166—190 |
| 2,612,943 | 10/1952 | Morgan et al. | 166—190 |
| 2,650,664 | 9/1953 | Sorensen | 166—139 |
| 2,701,019 | 2/1955 | Stead | 166—196 |
| 2,935,133 | 5/1960 | Eckel et al. | 166—196 |
| 2,941,424 | 6/1960 | Dixon | 74—88 |
| 2,997,107 | 8/1961 | Lynes | 166—204 |
| 3,115,189 | 12/1963 | Althouse et al. | 166—240 |

FOREIGN PATENTS 487  2/1877  Great Britain.

HARRISON R. MOSELEY, *Primary Examiner.*

BENJAMIN HERSH, CHARLES E. O'CONNELL, JACOB L. NACKENOFF, *Examiners.*

J. A. LEPPINK, *Assistant Examiner.*